United States Patent
Stephens et al.

(10) Patent No.: US 7,860,906 B2
(45) Date of Patent: *Dec. 28, 2010

(54) OVERFLOW PER SEGMENT

(75) Inventors: Maoni Z. Stephens, Sammamish, WA (US); Patrick H. Dussud, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 435 days.

This patent is subject to a terminal disclaimer.

(21) Appl. No.: 12/128,305

(22) Filed: May 28, 2008

(65) Prior Publication Data

US 2009/0300085 A1   Dec. 3, 2009

(51) Int. Cl.
*G06F 12/00* (2006.01)

(52) U.S. Cl. .................................... 707/813
(58) Field of Classification Search ............... 707/813, 707/609
See application file for complete search history.

(56) References Cited

U.S. PATENT DOCUMENTS

| | | | |
|---|---|---|---|
| 4,951,194 | A | 8/1990 | Bradley et al. |
| 5,652,883 | A | 7/1997 | Adcock |
| 6,081,665 | A | 6/2000 | Nilsen et al. |
| 6,314,436 | B1 * | 11/2001 | Houldsworth ............ 1/1 |
| 6,526,422 | B1 | 2/2003 | Flood et al. |
| 6,622,226 | B1 | 9/2003 | Dussud |
| 6,662,274 | B2 | 12/2003 | Subramoney |
| 6,823,351 | B1 | 11/2004 | Flood |
| 6,832,302 | B1 | 12/2004 | Fetzer et al. |
| 7,181,585 | B2 | 2/2007 | Abrashkevich et al. |
| 7,197,521 | B2 | 3/2007 | Subramoney |
| 7,328,323 | B1 | 2/2008 | Conover |
| 2004/0128329 | A1 | 7/2004 | Ben-Yitzhak et al. |
| 2006/0225135 | A1 | 10/2006 | Cheng et al. |
| 2007/0022149 | A1 | 1/2007 | Bacon |
| 2007/0083735 | A1 | 4/2007 | Glew |
| 2007/0162527 | A1 | 7/2007 | Wright |
| 2007/0203960 | A1 | 8/2007 | Guo |
| 2007/0255909 | A1 | 11/2007 | Gschwind |
| 2008/0052468 | A1 | 2/2008 | Speirs et al. |

OTHER PUBLICATIONS

U.S. Appl. No. 12/103,578, filed Apr. 15, 2008, Stephens.
PUBLIB.BOULDER.IBM.COM, "Detailed description of garbage collection", Based on information and belief available at least as early as Dec. 4, 2007, 5 pages.
IBM Developer Kit and Runtime Environment, Java 2 Technology Edition, Version 1.4.1, Service Refresh 1, "IBM JVM Garbage Collection and Storage Allocation Techniques", Nov. 2003, 59 pages.

(Continued)

*Primary Examiner*—Pierre M Vital
*Assistant Examiner*—Truong V Vo
(74) *Attorney, Agent, or Firm*—Workman Nydegger

(57) ABSTRACT

Per-segment overflow ranges. One method includes acts for handling overflows of a mark stack. A reference to an object is accessed. The object is processed by attempting to place references to other objects referenced in the object onto a mark stack. An overflow condition of the mark stack is detected. A range in a segment is defined which includes the object that caused the overflow condition. The range is assigned on a per segment basis such that the range is defined to only include addresses in a single segment.

8 Claims, 2 Drawing Sheets

OTHER PUBLICATIONS www.lispwork.com, "8.6 Garbage Collection Strategy", Lispworks User Guide—Dec. 14, 2001, 1 page.
"Garbage-First Garbage Collection", Aug. 9, 2004.
"IBM Websphere Portal V6 Self Help Guide", Jan. 21, 2008.
U.S. Appl. No. 12/103,578, Mail Date Aug. 23, 2010, Notice of Allowance.
Dybvig, R. Kent, et al., "Don't Stop the BIBOP: Flexible and Efficient Storage Management for Dynamically Typed Languages", Mar. 1994, 17 pages.
Hunt, Galen, et al., "An Overview of the Singularity Project", Oct. 2005, 44 pages.

* cited by examiner

OVERFLOW PER SEGMENT

BACKGROUND

Background and Relevant Art

In computer systems, there is often a need to manage memory. In particular, when objects are no longer used, it is useful to recover memory that was allocated for use with the objects. Some systems in use today use explicit memory management whereby the systems use a command to allocate memory and a corresponding command to free memory. For example, the C programming language includes a command "malloc" that can be used to allocate memory for an object and a command "free" that can be used to free memory that has been previously allocated. However, this type of memory allocation and de-allocation suffers from a number of drawbacks. In particular, free memory may be scattered throughout a memory structure. Additionally, this type of allocation and de-allocation allows for malicious attacks that can be used to compromise data. For example, a hacker can cause memory that has been allocated by one thread to be de-allocated such that a malicious thread can change or access data stored in the memory.

To combat these drawbacks, a system has been created using automatic memory management where the system includes garbage collectors for identifying objects that are being used and objects that are no longer being used. Memory for the objects no longer being used can be identified as free memory such that the memory can be used for the creation of new objects. Typical garbage collection involves marking objects that are in use by marking objects that can be reached beginning at a reference by a root and reclaiming memory for any objects that are not marked by sweeping the heap. Marking can occur by setting (or clearing) a flag (such as a single bit) in the object. After sweeping the heap, all flags for the objects are cleared (or set) such that subsequent garbage collection can take place.

To perform marking activities, a root provides a reference to one or more in use objects. These objects are visited and marked. References from these objects to other objects are then followed to the other objects. The other objects are marked and their references to still other objects are followed with this being repeated until all of the objects have been marked.

To facilitate marking, a mark stack may be employed. The mark stack allows references at one object to other objects to be entered on the mark stack. When the mark stack is limited in size, the mark stack may overflow. For example, if an object is visited that has 12 references and the mark stack only has 10 free entries, an overflow is determined to have occurred and references to the 12 referenced objects are not placed on the mark stack.

Typically, when an overflow occurs, an object heap including the objects is examined linearly by examining memory to determine if an object has been marked, and if it has been marked by following references in the object and marking the objects referenced by the references. While it may not be necessary to examine the entire object heap as a range of the object heap that includes overflows can be implemented, as can be appreciated, this can nonetheless result in a time consuming and resource intensive marking process.

The range is typically determined based on addresses of objects that have overflowed. Illustratively, the range typically starts at a size which may be represented by what actually appears to be a negative range. In particular, the maximum of the range is a beginning memory address of the object heap (e.g. 0) and the minimum of the range is the maximum address in the object heap or the maximum address possible for the memory on the machine. When an overflow is detected, the minimum of the range is redefined to be the minimum of the current minimum and the beginning address of the overflowed object. Thus, if the overflowed object is at 0×1000 and the current minimum of the range is maximum address of the object heap, then the minimum is defined to be 0×1000. Similarly, the maximum of the range is defined to be the maximum of the current maximum of the range and the overflowed object address. In this example, the maximum of the range is thus 0×1000.

As the process of defining an overflow range continues, an overflowed object may be discovered at 0×3000. Iterating the process described above, the maximum of the range becomes 0×3000 while the minimum of the range stays at 0×1000. If an overflowed object is then discovered at 0×500, then the range becomes, minimum=0×500, maximum=0×3000.

Notably, using this process, an overflow range may be defined over several segments of the object heap. Segments are portions of the object heap that are allocated by the operating system to store objects. A number of different segments may be allocated for storing objects. If the overflow range expands over more than one object, it is possible that the overflow range may include segments that do not actually have on overflow. Linearly processing these segments can be a waste of system resources.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method that may be practiced in a computing environment. The computing environment including application code that implements garbage collection functionality. The garbage collection functionality includes pushing object references onto a mark stack. Objects referenced on the mark stack can be marked so as to prevent memory for the objects from being recycled for use with other object instances. The method includes acts for handling overflows of a mark stack. A reference to an object is accessed. The object is processed by attempting to place references to other objects referenced in the object onto a mark stack. An overflow condition of the mark stack is detected. A range in a segment is defined which includes the object that caused the overflow condition. The range is assigned on a per segment basis such that the range is defined to only include addresses in a single segment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
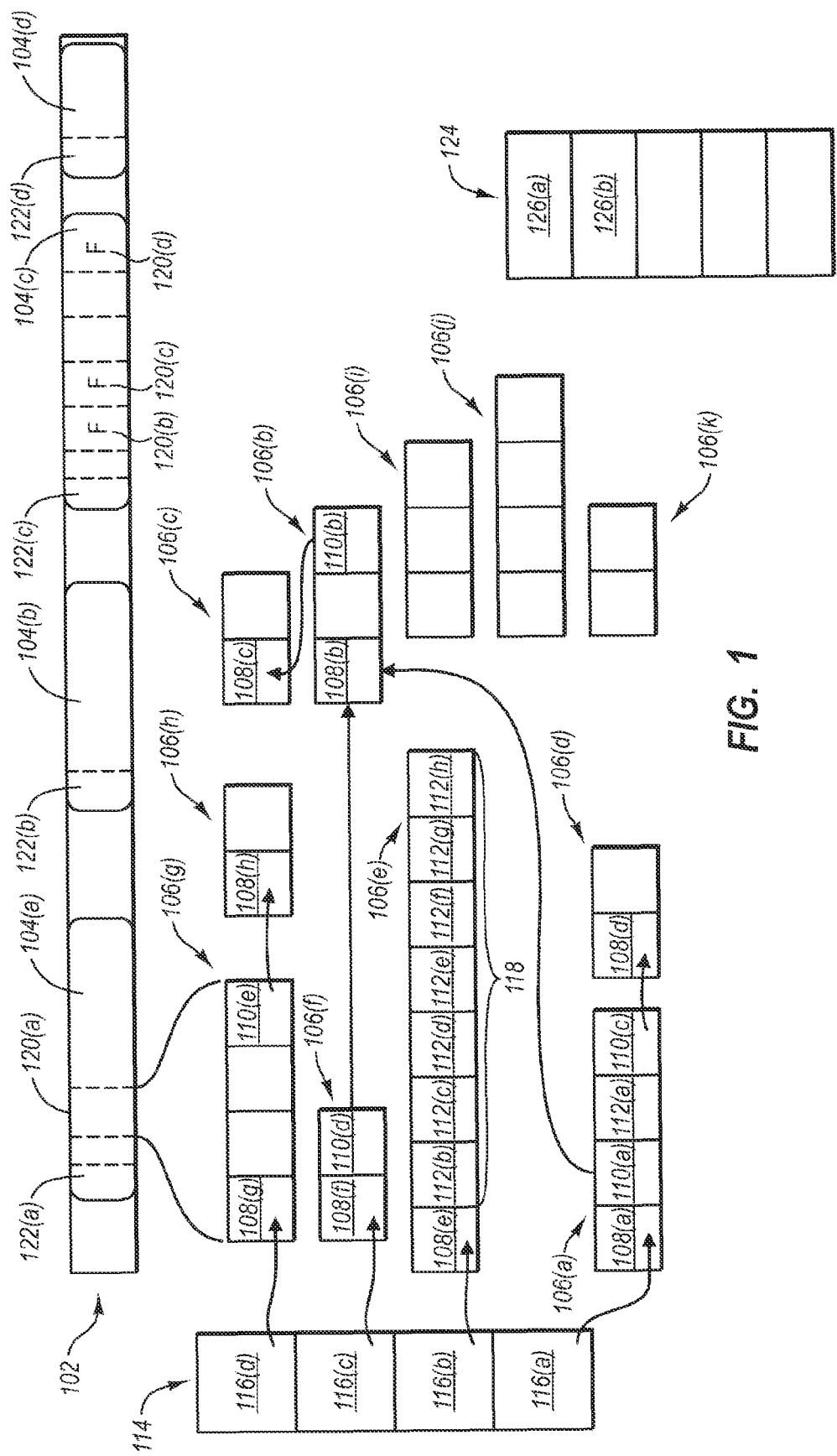
FIG. 1 illustrates a garbage collection environment where some embodiments may be practiced.

Referring now to FIG. 1, an example of various garbage collection activities and allocation activities are illustrated. FIG. 1 illustrates an object heap 102. The object heap 102 comprises system memory, such as system RAM or other system memory that can be used to store objects. The object heap 102 includes a number of segments 104. Segments 104 may be assigned by the operating system for in storing managed objects. It should be noted that this point that references to designators in the Figures may be made generically or specifically when the Figures include more than one instance of an item illustrated. For example a generic reference may include a reference to segments 104 generically while a reference to a specific segment may include an additional designators appended to a reference such as is illustrated in FIG. 1 where the specific references to segments 104 include additional designators such that the specific references may be 104(a), 104(b), 104(c), and 104(d).

A segment 104 is a portion of the object heap 102 that has been allocated by an operating system to store objects in memory spaces 120 for code running in the operating system environment. FIG. 1 further illustrates a number of objects 106 that may be stored in the segments 104.

An object 106 may include additional portions that vary from object to object. For example, an object 106 may include a header 108 that includes information about the object 106 including such information as class type, size, etc. The object 106 may include references 110 to other objects 106. Additionally an object 106 may include data members 112. Data members 112, such as data member 112(a) may include raw low level data, such as integers, Booleans, floating point numbers, characters, or strings.

Illustrating now garbage collection marking and sweep activities, FIG. 1 illustrates a root 114. The root 114 includes references to objects that are currently being used. To perform garbage collection, a reference in a root entry may be followed to an object. For example, the root reference 116(a) points to an object 106(a). In the example illustrated, the object 106(a) can then be marked to indicate that the object 106(a) is currently in use. In one embodiment, marking an object 106 as being currently in use may include setting a bit or clearing a bit in the header 108 of an object 106. Thus, in the example illustrated, a bit set aside for the purpose of marking an object may be set in the header 108(a) of object 106(a) to mark the object 106(a). Other data structures, such as bit tables or other tables may alternatively be used to mark objects 106.

Once an object 106 is accessed due to a reference by a root reference 116, then other references 110 in the object can be followed to mark other objects. For example, the reference 110(a) points to an object 106(b). Following the reference 110(a) allows the object 106(b) to be marked by setting a bit in the header 108(b) to indicate that the object 106(b) is currently in use. References 110 in the object 106(b) can be followed to find other objects 106 as well. For example, the object 106(b) includes a reference 110(b) that points to an object 106(c). Following the reference 110(b) to the object 106(c) allows the object 106(c) to be marked as being currently in use by setting a bit in the header 108(c).

Because the object 106(c) does not include references 110 to any other objects, Processing may then return to object 106(a) to follow the reference 110(c) to the object 106(d). Object 106(d) is then marked as being currently in use by setting a bit in the header 108(d). Because the object 106(d) does not include any references 110, processing can return to the root 114 to examine the root reference 116(b) which references an object 106(e). The object 106(e) can then be marked, by setting a bit in the header 108(d), as being currently in use. In this particular example, the object 106(e) includes an array 118 of data members 112(b)-112(h) Thus the object 106(e) does not include any references 110 to other objects 106. Processing therefore returns to the root 114 to examine the root reference 116(c). The root reference 116(c) points to an object 106(f). The object 106(f) is marked by setting a bit in the header 108(f) to indicate that the object 106(f) is in use.

The object 106(f) includes a reference 110(d). The reference 110(d) points to an object 106(b). At this point, a determination is made that the object 106(b) has already been marked and thus processing on this particular chain such that processing is returned to the root 114. In particular, it should be noted that processing may include checking a mark bit in a header 108 before marking an object 106. Thus, objects 106 that have already been marked can be discovered so as to economize system resources when performing marking operations.

At the root 114, a root reference 116(d) is referenced which points to an object 106(g). The object 106(g) is marked by setting a bit in the header 108(g). The object 106(g) includes a reference 110(e) which points to an object 106(h). The object 106(h) is marked by setting a bit in the header 108(h) to indicate that the object 106(h).

At this point, because the root 114 includes no further removed references 116, and all of the objects referenced by root references 116 or references 110 in other previously referenced objects 106 have been followed, a sweep operation can be performed. It will be noted that FIG. 1 illustrates three objects object 106(i) object 106(j) and object 106(k) that have not been marked and are thus eligible to have their memory recovered for use for other objects. In one embodiment, this may be accomplished by marking memory space in segments 104 as free space. This is illustrated in segment 104(c) where memory spaces 120(b) 120(c) and 120(d) have been marked as free space.

While the example illustrated above has shown that objects 106 are traced and marked directly, marking may include the use of a mark stack 124. In particular, when an object 106 is reached due to following a reference, all of that objects references are placed on the mark stack 124 such that the mark stack 124 can be used to ensure that all of the appropriate mapping takes place.

For example, in the example illustrated in FIG. 1, following the root reference 116(*a*) to the object 106(*a*) results in references to the objects 106(*b*) and 106(*d*) referenced by 110(*a*) and 110(*c*) respectively being pushed onto the mark stack 124 as mark stack references 126(*b*) and 126(*a*) respectively. The reference 126(*a*) in the mark stack 124 to object 106(*b*) is then popped from the mark stack 124 to map to the object 106(*b*). When object 106(*b*) is mapped to, then a reference to object 106(*c*) is pushed to mark stack reference 126(*a*) of the mark stack 124 due to the reference 110(*b*). The reference in the mark stack to object 106(*c*) is popped from the mark stack, where after it is determined that object 106(*c*) has no references. Thereafter, the reference to object 106(*d*) is popped from the mark stack 124 where it is determined that object 106(*d*) has no references. Because the mark stack 124 is empty at this point, processing continues at the root reference 116(*b*) in the same fashion described above. Additionally, processing may further continue with root references 116(*c*) and 116(*d*) until all of the in use objects have been marked.

As can be imagined, when the mark stack 124 is limited in size, overflows of the mark stack 124 can occur. For example, consider a case where a mark stack 124 has 10 free entries, but a reached object 106 has 12 references. This condition can be detected and an indicator that the mark stack has overflowed can be provided. When this occurs, some systems look at and mark objects directly in the object heap 102 by linear examination of the object heap 102. For example, a garbage collector thread may begin examining a segment 104. When an overflow condition occurs, an object is discovered by linear examination beginning at a segment 104. A determination is made as to whether or not the object is marked. If the object is marked, then the garbage collector traces through the references of the object. If the object is not marked, the garbage collector jumps past the object (by jumping memory the size of the object as indicated by an object size) to begin examining further portions of the segment 104.

One optimization that has been implemented is limiting the amount of the object heap that needs to be linearly examined by specifying ranges where overflows have occurred. For example, an initial range may be specified where the range is defined as follows:

Min=MaxPointer

Max=0

This range specifies that the beginning of the range is a maximum memory address in the object heap 102 and that the maximum of the range is 0. In other words, there are no addresses in the range.

Now assume that an overflow is detected for an object that has a starting address of 0×1000. A calculation can be performed to increase the range according to the discovery of the overflowed object. In particular, the following algorithm is applied to the present range:

Min=min(Min,OverflowAddress)

Max=max(Max,OverflowAddress)

The algorithm causes the new Min (i.e. the minimum of the range for linear examination of the object heap 102) to be the minimum of the present Min and the Address, which is the minimum of MaxPointer and the OverflowAddress (i.e. 0×1000), which is 0×1000. The algorithm causes the new Max (i.e. the maximum of the range for linear examination of the object heap 102) to be the maximum of the present Max and the Address, which is the maximum of 0 and the OverflowAddress (i.e. 0×1000). Thus the new Max is 0×1000 and the new range is:

Min=0×1000

Max=0×1000

Assume now that another object causes an overflow, where the other object is located t address 0×3000. In this case, using the same algorithm illustrated above, the range is expanded to:

Min=0×1000

Max=0×3000

Linear examination of the object heap includes linear examination of segment portions that fall within this range.

As noted, the preceding algorithm may result in the requirement that linear examinations on the object heap include segments in the object heap that do not include any overflowed objects. For example, and referring to FIG. 1, the segment 104(*a*) may include an overflowed object, and the segment 104(*d*) may include an overflowed object, while the segments 104(*b*) and 104(*c*) do not include any overflowed objects. Nonetheless, using the process above, without modification, results in linear examination of the segments 104(*b*) and 104(*c*). Thus, some embodiments described herein include functionality for limiting overflow ranges on a per segment basis. Thus, in the example illustrated above where an overflowed object is stored in segment 104(*a*) and an overflowed object is stored in segment 104(*d*), overflow ranges can be maintained on a per segment basis for segments 104(*a*) and 104(*d*).

In some embodiments, the overflow ranges for each of the segments may be included in a header 122 for each of the segments. In particular, each of the segments 104(*a*), (*b*), (*c*), and (*d*) include a corresponding header 122(*a*), (*b*), (*c*), and (*d*) respectively in the segment that includes the overflow range for the segment.

The following discussion now refers to a number of methods and method acts that may be performed. It should be noted, that although the method acts may be discussed in a certain order, no particular ordering is necessarily required unless specifically stated, or required because an act is dependent on another act being completed prior to the act being performed.

Figure 2:
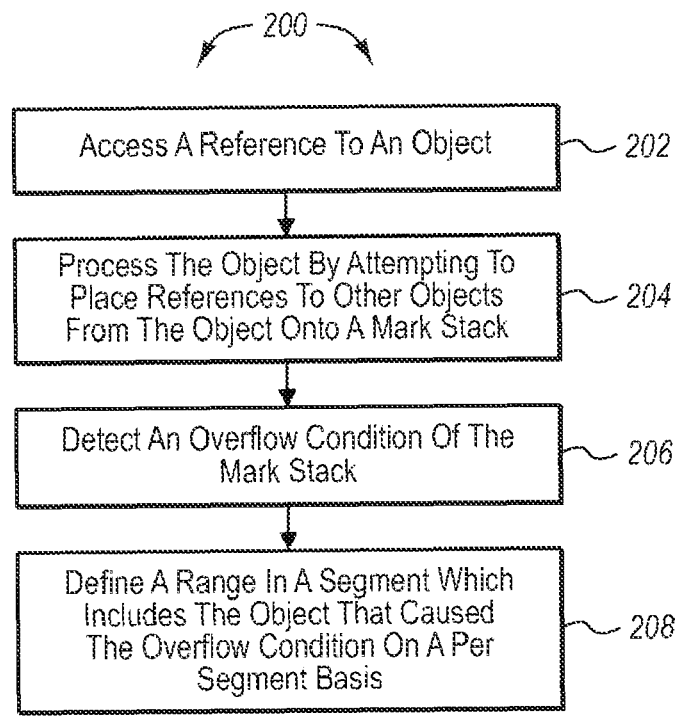
FIG. 2 illustrates a method of handling overflows of a mark stack.

Referring now to FIG. 2, an example method 200 is illustrated. The method may be practiced in a computing environment including application code that implements garbage collection functionality. The garbage collection functionality includes pushing object references onto a mark stack such that objects referenced on the mark stack can be marked so as to prevent memory for the objects from being recycled for use with other objects instances. The method includes acts for handling overflows of a mark stack. The method includes accessing a reference to an object (act 202). Accessing a reference to an object may include accessing a reference at a root. FIG. 1 illustrates a number of roots 116 which include references to objects 106. Thus, accessing a reference to an object (act 202) may be performed by accessing references in one or more of the roots 116.

Alternatively, accessing a reference to an object may include accessing a reference at a mark stack. For example, FIG. 1 illustrates the mark stack 124. References 110 in objects 106 reference other objects. These references 110 can be placed on the mark stack 124 for later use in processing referenced objects 106. Thus, in some embodiments, the act of accessing a reference to an object (act 202) may include accessing a reference at the mark stack 124.

The method 200 further includes processing the object by attempting to place references to other objects referenced in the object onto a mark stack (act 204). The mark stack is configured to facilitate processing objects to which references have been placed on the mark stack to prevent memory for the objects referenced on the mark stack from being reclaimed for other objects. For example, in FIG. 1 the object 106(*a*) includes reference 110(*a*) and 110(*c*) which reference objects 106(*b*) and 106(*d*) respectively. Processing object 106(*a*) includes attempting to place references to one or more of objects 106(*b*) and 106(*d*) on the mark stack 124 based on the references 110(*a*) and 110(*c*).

The method 200 further includes detecting an overflow condition of the mark stack (act 206). For example, it may be determined that references to objects 106(*b*) and 106(*d*) cannot be placed onto the mark stack because the mark stack 124 is full or because the number of references to be placed on the mark stack exceeds the available capacity of the mark stack 124.

The method 200 further includes defining a range in a segment which includes the referenced object that caused the overflow condition on a per segment basis (act 208). In some embodiments, the range may be defined in the header of the segment. For example, if the references 110(*a*) and 110(*c*) caused the overflow, then a range 104 in the heap 102 that includes object 106(*a*) would be defined, where the definition of the range is stored in a header 122. The range is defined to only include addresses in a single segment. Thus, if the object 106(*a*) was included in the segment 104(*a*), then the range would be defined to only include addresses in the range 104(*a*), and not include any addresses in the ranges 104(*b*), 104(*c*) and 104(*d*).

The method 200 may be practiced where defining a range includes defining a range minimum, where the range minimum is the minimum of a previous range minimum and an address of the referenced object and defining a range maximum, wherein the range maximum is the maximum of a previous range maximum and the address of the referenced object. For example, If the segment 104(*a*) includes addresses from 0×1000 to 0×3000, a range has previously been defined to be from 0×1000 to 0×2000, and the address of the object 106(*a*) is at 0×2500, then the newly defined range has a range minimum which is the minimum of 0×1000 and 0×2500 and a range maximum which is the maximum of 0×2000 and 0×25000, which means that the new range is 0×1000 to 0×2500.

The method 200 may further be practiced to include initializing the range prior to defining the range. In one embodiment, initializing the range includes defining the maximum of the range to be the minimum address of the segment and defining the minimum of the range to be the maximum address of the segment. In the example illustrated above, an initialized range for the segment 104(*a*) has a range minimum of 0×3000 and a range maximum of 0×1000. As used herein, this is a non-positive range, because the minimum is an address with a greater numerical value than the range maximum. However, it should be noted that a range with the same range minimum and range maximum, as used herein is defined as both positive and non-zero. Thus, if a range has a range minimum of 0×2500 and a range maximum of 0×2500, the range is nonetheless, for purposes of the present disclosure both positive and non-zero. In particular, this range indicates a single overflowed object in the segment where the object has an address of 0×2500.

In some embodiments, initializing the range may include defining the maximum of the range to be 0×0. Alternatively, initializing the range may include defining the maximum of the range to be the minimum address of the segment. Initializing the range may include defining the minimum of the range to be the maximum address of the segment. For example, in the embodiment illustrated above, the minimum of the range may be defined to be 0×3000. In an alternative embodiment, the initialized range for a particular segment could be defined with the minimum being MaxPointer, which points to the maximum memory address for a machine. In some embodiments these initializations are performed to cause the range to be negative in size, which can be used to indicate that no overflowed objects are contained in the segment.

Figure 3:
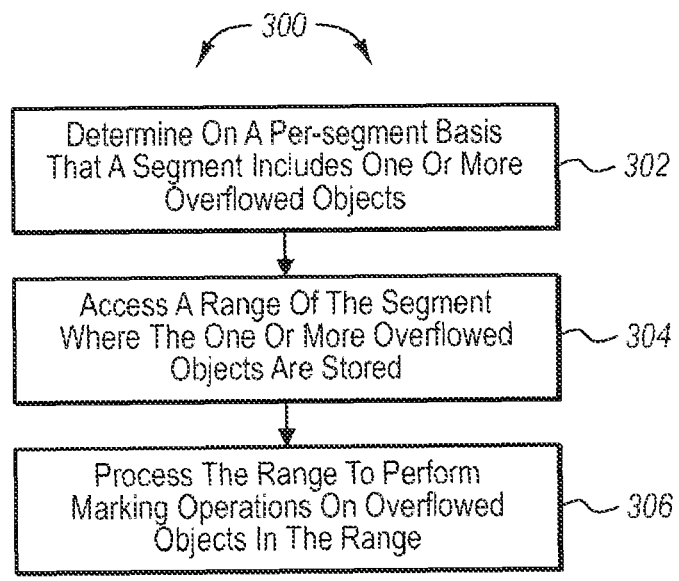
FIG. 3 illustrates a method of detecting object overflows of a mark stack on a per segment basis.

Referring now to FIG. 3, a method 300 is illustrated. The method 300 may be practiced in a computing environment including application code that implements garbage collection functionality. The garbage collection functionality includes pushing object references onto a mark stack. Objects referenced on the mark stack can be marked so as to prevent memory for the objects from being recycled for use with other objects instances. The method 300 includes acts for detecting object overflows of a mark stack on a per segment basis.

The method 300 includes determining on a per-segment basis that a segment includes one or more overflowed objects (act 302). In particular, act 302 is performed such that overflows are determined for all segments 104 in the heap 102 individually. This may be performed by referencing indicators associated each with their own segment 104. In some embodiments, these indicators may be included in a header 122 of an object segment 104.

In one embodiment, determining on a per-segment basis that a segment includes one or more overflowed objects (act 302) includes determining that the range of the segment is a positive, non-zero range. In the examples above illustrated in reference to FIG. 2, ranges where the range minimum is less than the range maximum, such as the range with the range minimum of 0×1000 and the range maximum of 0×2000, are positive, non-zero ranges. Further, as used herein a range with the same range maximum and range minimum is also positive and non-zero.

The method 300 further includes accessing a range of the segment where the one or more overflowed objects are stored (act 304). As noted, because the range is defined on a per segment basis, the range includes only memory in the segment.

The method 300 further includes processing the range to perform marking operations on overflowed objects in the range (act 306).

Embodiments herein may comprise a special purpose or general-purpose computer including various computer hardware, as discussed in greater detail below.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment including application code that implements garbage collection functionality, wherein the garbage collection functionality includes pushing object references onto a mark stack, such that objects referenced on the mark stack can be marked so as to prevent memory for the objects from being recycled for use with other object instances, a method of handling overflows of a mark stack, the method comprising:
    (a) accessing a reference to an object;
    (b) processing the object by attempting to place references to other objects referenced in the object onto a mark stack, the mark stack being configured to facilitate marking objects to which references have been placed on the mark stack to prevent memory for the objects referenced on the mark stack from being reclaimed for other objects;
    (c) detecting an overflow condition of the mark stack;
    (d) initializing a range in a single segment which includes the object that caused the overflow condition on a per segment basis, wherein initializing the range comprises defining the maximum of the range to be the minimum address of a segment and defining the minimum of the range to be the maximum address of the segment; and
    (e) defining the range such that the range is defined to only include addresses in the single segment, wherein each object is stored in a segment from among a plurality of different segments of a memory heap, wherein defining a range which includes the object comprises:
        defining a range minimum, wherein the range minimum is the minimum of a previous range minimum and an address of the referenced other object; and
        defining a range maximum, wherein the range maximum is the maximum of a previous range maximum and the address of the referenced other object.

2. The method of claim 1, wherein accessing a reference to an object comprises accessing a reference at a root.

3. The method of claim 1, wherein accessing a reference to an object comprises accessing a reference at the mark stack.

4. The method of claim 1 wherein initializing the range comprises defining the maximum of the range to be 0x0.

5. The method of claim 1, further comprising storing the range in a header of the segment.

6. In a computing environment including application code that implements garbage collection functionality, wherein the garbage collection functionality includes pushing object references onto a mark stack, such that objects referenced on the mark stack can be marked so as to prevent memory for the objects from being recycled for use with other objects instances, a computer readable storage medium implementing overflow handling of a mark stack on a per segment basis, wherein each object is stored in a segment from among a plurality of different segments of a memory heap, the computer readable storage medium comprising:
    a plurality of memory segments, each of the segments comprising a range of memory assigned by the same system resource manager, and wherein each segment comprises:
    a header, the header comprising a portion of the memory of the segment;
    an indicator configured to be used to indicate if a given includes overflowed objects, wherein the indicator is included in the header; and
    a specification of a range specifying a memory range in the given segment and only for the given segment, where the range, when positive and non-zero, includes all overflowed objects in the given segment and does not include any overflowed objects from different segments, further wherein the specification of the rage is included in the header, wherein the range is initially initialized such that the maximum of the range is the minimum address of a segment and the minimum of the range is the maximum address of the segment, but whereafter the range is defined where the range minimum is the minimum of a previous range minimum and an address of a referenced object and wherein the range maximum is the maximum of a previous range maximum and the address of the referenced object.

7. The computer readable storage medium of claim 6, wherein the indicator comprises the specification of range.

8. The computer readable storage medium of claim 7, wherein when the range is a positive, non-zero range, the given segment includes one or more overflowed objects.

* * * * *